March 5, 1946.    R. O. ANDERSON ET AL    2,396,071
APPARATUS FOR ABSORBING SHOCK LOADS
Filed April 14, 1943    4 Sheets-Sheet 1
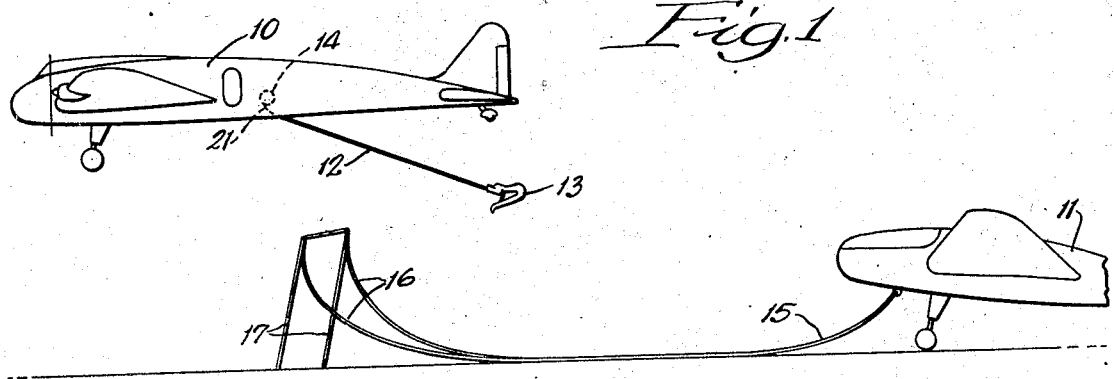
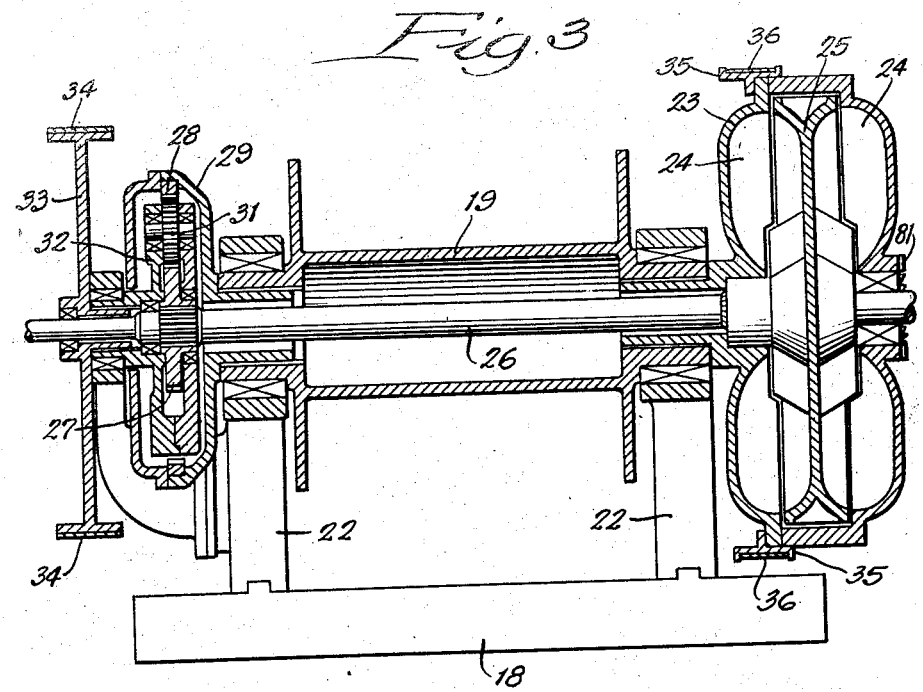
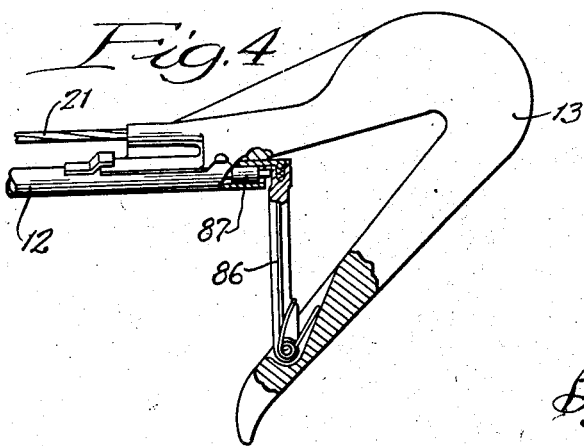
Inventors:
Wallace F. Ardussi,
Rexford O. Anderson
and Max E. Landry,
By Dawson Cows any Booth
Attorneys.

March 5, 1946.　　R. O. ANDERSON ET AL　　2,396,071
APPARATUS FOR ABSORBING SHOCK LOADS
Filed April 14, 1943　　4 Sheets-Sheet 2

Inventors
Wallace P. Ardussi,
Rexford O. Anderson
and Max E. Landry,
By Dawson, Ooms & Booth
Attorneys.

March 5, 1946. R. O. ANDERSON ET AL 2,396,071
APPARATUS FOR ABSORBING SHOCK LOADS
Filed April 14, 1943 4 Sheets-Sheet 3
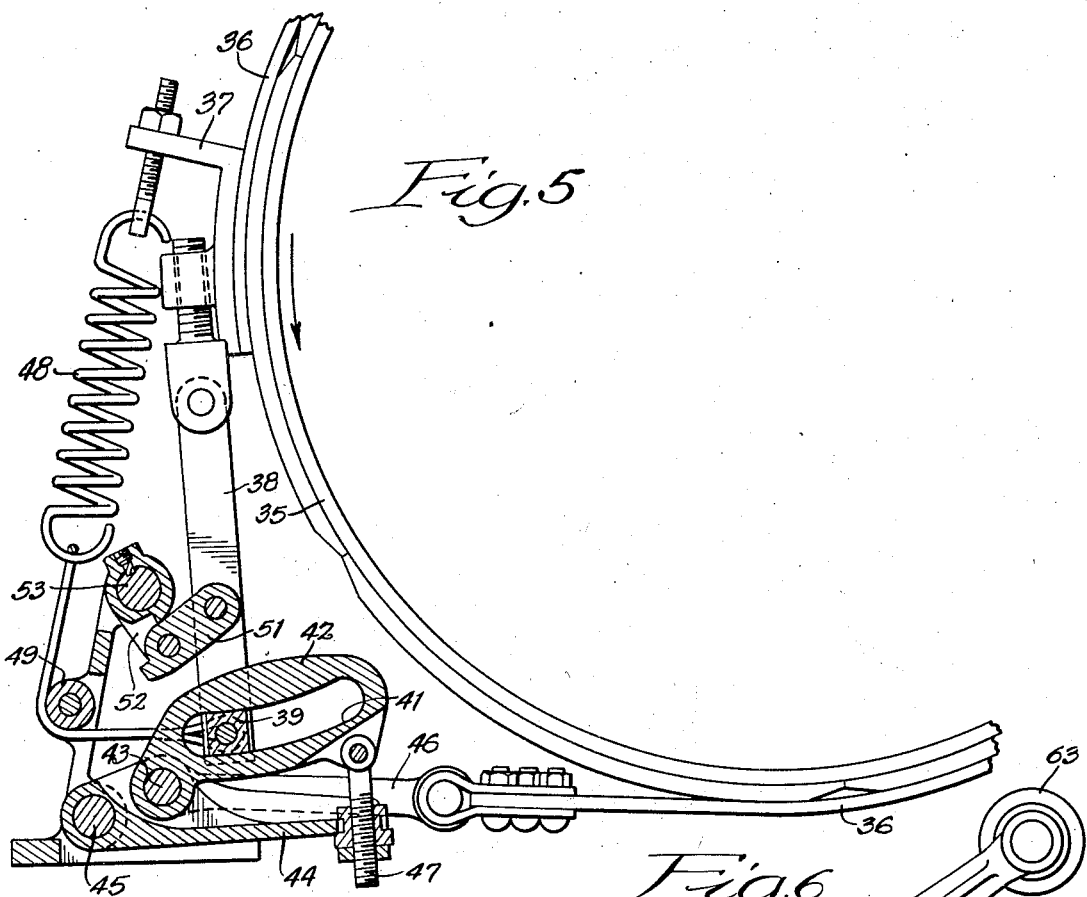
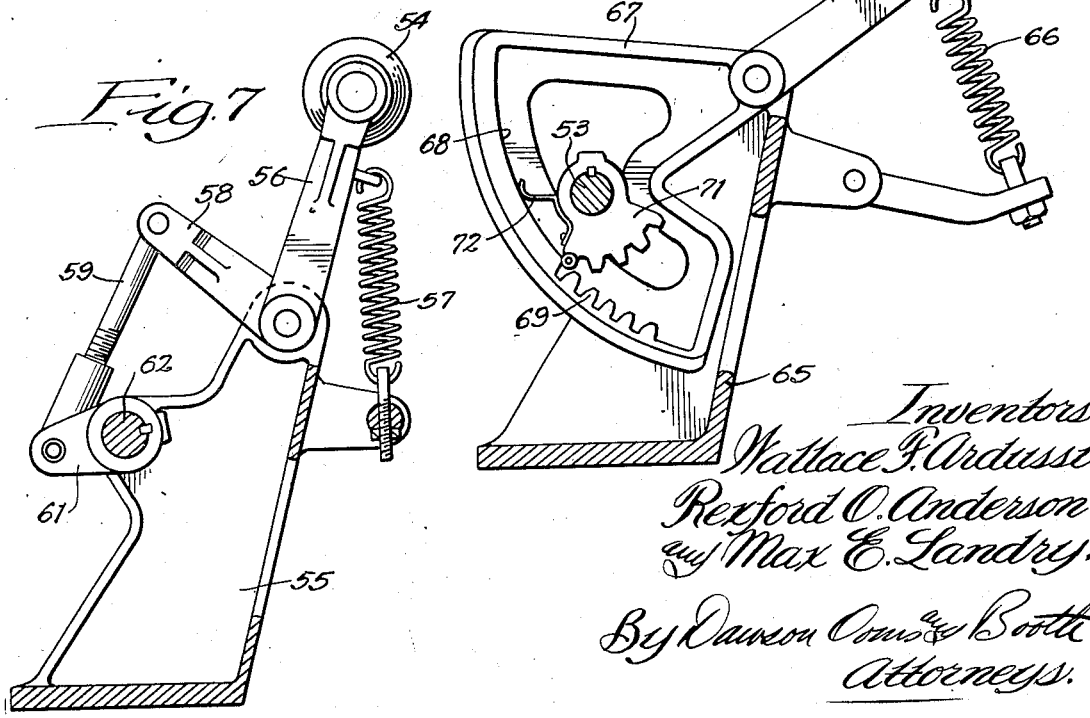

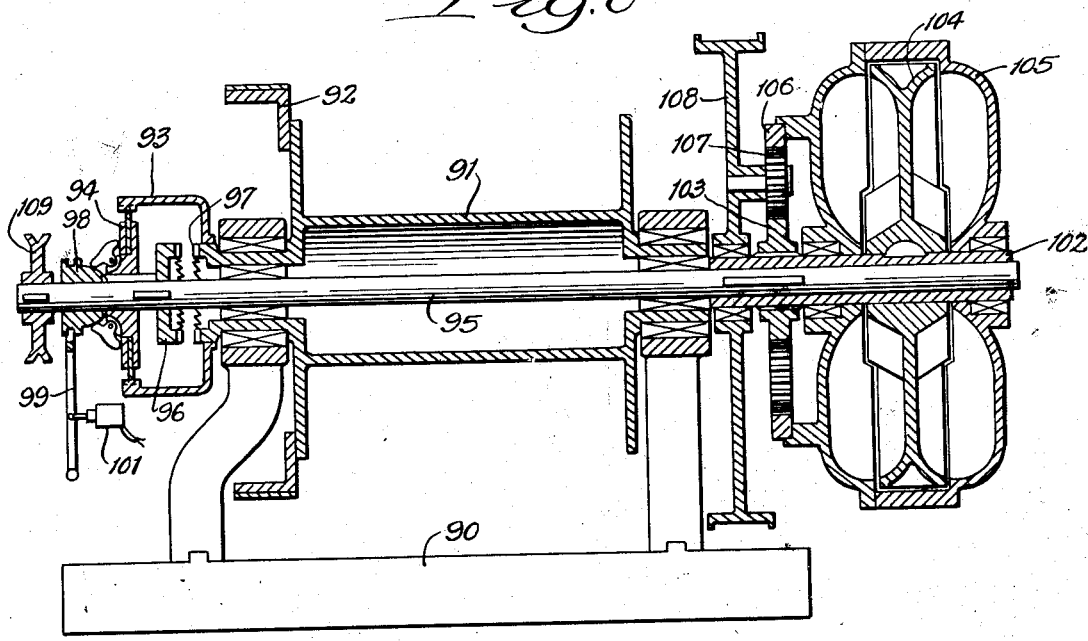
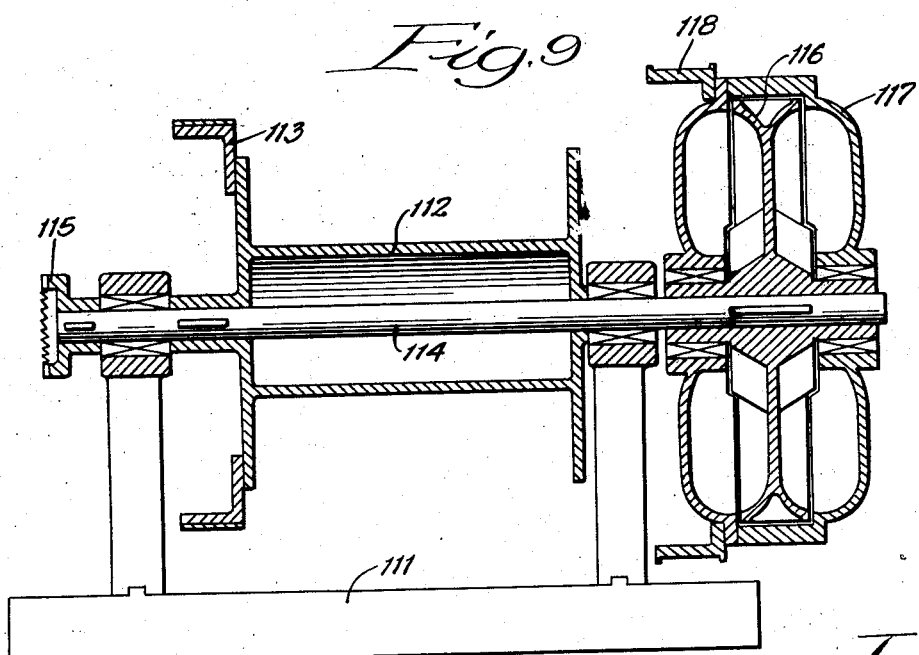

Patented Mar. 5, 1946

2,396,071

UNITED STATES PATENT OFFICE 2,396,071

APPARATUS FOR ABSORBING SHOCK LOADS

Rexford O. Anderson, Chicago, Ill., Max E. Landry, Tulsa, Okla., and Wallace F. Ardussi, Chicago, Ill.; said Ardussi assignor to Foote Bros. Gear and Machine Corporation, Chicago, Ill., a corporation of Delaware Application April 14, 1943, Serial No. 483,078

10 Claims. (Cl. 254—173)

This invention relates to apparatus for absorbing shock loads and more particularly to apparatus for smoothly and evenly picking up a stationary load with a moving vehicle or for bringing a moving vehicle to rest.

The invention is particularly described herein in connection with an apparatus for picking up gliders by an airplane but it will be understood that it is equally useful to bring a moving plane to rest or absorb other similarly produced shock loads. In picking up gliders and particularly relatively large gliders, it is necessary that the accelerating force be applied evenly and smoothly to avoid damage to the plane or glider and shock to the occupants. The present invention has for one of its principal objects the provision of apparatus for absorbing sudden shock loads of this type in which the force however made effective is applied gradually and smoothly from a zero value to the maximum value required. The time cycle of this force absorption can be varied to suit any specific application.

Another object of the invention is to provide apparatus for absorbing shock loads in which the inertia of the rotating mass of the pickup apparatus is neutralized by giving the apparatus a velocity substantially equal to the relative velocity between the pickup and load at the time of connection. According to one important feature of the invention, the velocity of the pickup apparatus is produced by a cartridge operated motor to give extremely rapid acceleration of the pickup to the desired velocity. In another advantageous construction, parts of the pickup apparatus may be driven at the desired velocity and clutched to the reel thereof to drive it.

Another object of the invention is to provide apparatus for absorbing shock loads in which the device for driving the pickup to neutralize its inertia effect is controlled by completion of the connection between the pickup and load. In one desirable arrangement a hook is used to connect the pickup and load and the driving device is controlled by the hook.

Still another object of the invention is to provide a device for absorbing shock loads in which a braking force is gradually and progressively applied to the pickup after it is connected to the load.

A further object of the invention is to provide an apparatus for absorbing shock loads in which initial braking is effected through a hydraulic coupling and final braking is applied directly through a friction brake.

A still further object of the invention is to provide apparatus for absorbing shock loads in which application of the brake force is controlled by the amount of cable remaining on the pickup reel.

The above and other objects and advantages of the invention will be more readily apparent from the following description when read in connection with the accompanying drawings, in which—

Figure 1 is a diagrammatic view indicating use of the invention to pick up a glider by an airplane;

Figure 3 is a diagrammatic section illustrating the connections between the parts of Figure 2;

Figure 4 is a side view of a hook with parts in section;

Figure 5 is a partially enlarged section on the line 5—5 of Figure 2 showing the brake operating mechanism;

Figure 2:
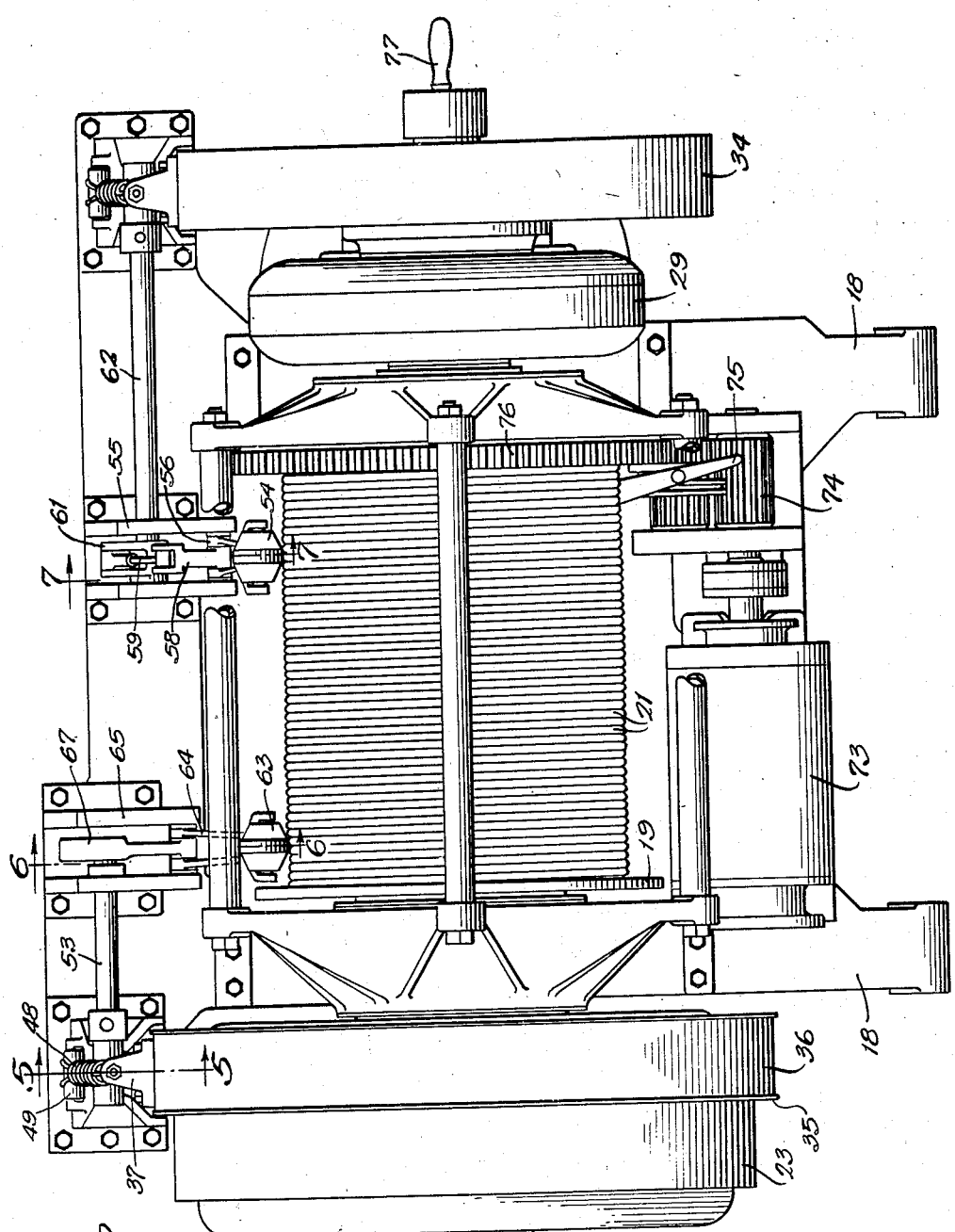
Figure 2 is a top plan view of the pickup mechanism.

Figures 6 and 7 are partially enlarged sections on the lines 6—6 and 7—7 respectively of Figure 2 showing the brake control mechanism; and Figures 8 and 9 are diagrammatic sections similar to Figure 3 showing alternative constructions.

One use of the invention is illustrated in Figure 1 in which a pickup device is carried by an airplane 10 to pick up a glider 11 while the airplane is in flight. For this purpose, the airplane is provided with a rod 12 projecting from its under surface and detachably carrying at its outer end a grappling hook 13. The hook 13 is connected by a cable to a reel 14 in the airplane.

The glider is connected to a tow cable 15 terminating at its end in a loop 16 supported on masts 17. To pick up the glider the plane 10 is flown over the loop at such an altitude that the hook 13 will engage the loop and detach it from the masts 17. The hook 13 will at the same time, be detached from the rod 12 so that cable on the reel 14 will pay out at a gradually decelerating speed to pick up gradually the glider load. After a relatively short interval, the reel 14 may be gradually and fully braked so that the glider will be connected directly to the tow plane through the cable on the reel and the tow cable 15.

One apparatus for controlling the reel in the plane is shown in Figures 2 and 3 comprising a frame 18 adapted to be rigidly mounted in the plane and rotatably carrying a reel 19 on which cable 21 is wound. The reel is supported in bearings in posts 22 on the frame and is connected at one end to the outer housing 23 of a hydraulic transmission which may be of the type more particularly described and claimed in the patent to Carson and Anderson, No. 2,150,539, issued March 14, 1939. The housing 23 carries sets of vanes 24 at its sides between which there is mounted a vaned rotor member 25 cooperating with the vanes 24 to form a double liquid circuit. The rotor member 25 is drivably connected to a shaft 26 extending through the hub of the reel 19 and connected at the other side of the reel to the sun gear 27 of a planetary differential gear unit. This unit includes a ring gear 28 carried by a housing 29 which is connected to the reel and sets of planet pinions 31 on a carrier 32.

The carrier 32 of the gear set is connected to a brake drum 33, having a brake band 34 engageable with it to hold the brake drum stationary and a similar brake drum 35 is formed on the housing 23 of the hydraulic transmission through which it is connected directly to the reel. A brake band 36 cooperates with the drum 35 to hold it stationary when desired.

The brake bands 34 and 36 are controlled through a mechanism illustrated more particularly in Figure 5 to apply a progressively increasing force. As shown in Figure 5, this mechanism comprises a bracket 37 connected to one end of the band 36. A link 38 is pivoted at one end to the bracket and carries at its other end a block 39 sliding in an arcuate slot 41 in a lever 42 which is pivoted at 43 to a second lever 44 fixedly pivoted at 45. The pivot connection 43 is connected through a link 46 to the opposite end of the band 36 and the outer end of lever 42 is adjustably connected by a bolt 47 to the free end of lever 44.

The bracket 37 is adjustably connected to one end of a tension spring 48 which passes around a pulley 49 and has its opposite end connected to the block 39. The mechanism is controlled by rocking the link 38 through a link 51 connected to arm 52 on a pivot 53. When the shaft 53 is turned counterclockwise to its extreme position the block 39 will lie in the right end of slot 41 to produce a leverage ratio between the two ends of the brake greater than the wrap ratio of the brake so the brake will release as more fully described in the patent to Carson and Anderson No. 2,116,013. As the shaft 53 turns clockwise the block 39 will be moved to the left to vary the leverage ratio between the two ends of the brake band until it becomes less than the wrap ratio so that the band becomes progressively more and more self-energizing and its braking effect on the drum gradually increases. When the block 39 finally reaches the left end of the slot 41 as shown in Figure 5 the leverage ratio will be such as to lock the brake positively to prevent any further rotation of the drum. The mechanism for controlling the band 34 is similar and will not be described in detail.

Engagement of both of the brakes is controlled in accordance with the diameter of the cable 21 on the reel 19 to cause their progressive application as the diameter decreases. For this purpose the brake 34 is controlled by a follower roller 54 engaging the cable on the reel and supported by a bracket 55 mounted on the frame adjacent the reel. The roller 54 is carried by a lever 56 pivoted on the bracket 55 and is urged into engagement with the cable by a spring 57. The lever 56 has an extending arm 58 connected through an adjustable link 59 with an arm 61 secured to a shaft 62. The shaft 62 connects to the brake actuating mechanism for the band 34 and corresponds to the shaft 53 shown in Figure 5. With this construction, when the reel is full of cable the brake 34 will be disengaged and will be gradually and progressively brought into engagement as the diameter of the cable on the reel decreases.

The brake 36 is similarly controlled by a follower roller 63 engaging the cable on the reel and carried by a lever 64 pivoted on a bracket 65. A spring 66 holds the follower 63 in engagement with the cable. The lever 64 as shown in Figure 6 carries an extension 67 formed on one side with an arcuate surface 68 terminating adjacent one end in internal gear teeth 69. The teeth 69 are adapted to mesh with gear teeth on a segment 71 keyed to the shaft 53, a roller being carried by the end tooth 71 to ride on the surface 68. A spring 72 on the segment 71 engages the surface 68 and tends to rock the segment in a direction to engage the roller in the first tooth with surface 68 and later with the teeth 69.

With this construction, when the reel is substantially full of cable, the lever 64 will be rocked to a position to bring the arcuate surface 68 opposite the segment 71. As the lever turns in response to a reduction in diameter of the cable on the reel, the extension 67 will be turned toward the position shown in Figure 6. Toward the end of this movement, the segment 71 will engage the gear teeth 69 to turn the segment and the shaft 53 and engage the brake 36. By properly positioning the teeth 69 on the extension, it will be seen that the brake 36 can be engaged at any desired time subsequent to the engagement of the brake 34. This brake serves as a safety device to prevent withdrawal of all of the cable from the reel and also provides the final braking force to stop completely the rotation of the reel.

As shown in Figure 2, the cable may be rewound on the reel by a motor 73 connected through gearing 74 and a clutch 75 to gear teeth 76 formed on one flange of the reel. When the motor 73 is operating and the clutch 75 engaged the reel will be turned in a direction to wind the cable thereon either for rewinding purposes or for shortening the distance between the tow plane and the glider. A hand crank 77 may be connected to one end of the shaft 26 to permit manual rewinding if desired.

In picking up relatively heavy loads it will be apparent that the inertia of the reel and its associated parts would be sufficient to cause a rather severe shock at the time of connection of the cable to the load. In order to eliminate this condition, means are provided according to the present invention to drive the reel in a direction to unwind cable therefrom at a speed substantially equal to the relative velocity between the tow plane and the load. As shown in Figure 2, this is accomplished by providing an expansion motor 78 having a movable clutch 79 at one end for connection with a complementary clutch 81 formed on the outer end of the fluid coupling housing 23. The motor is supplied with actuating fluid from a breech assembly 82 connected to the motor through a conduit 83, the motor exhausting through a similar conduit 84. The breech assembly may be controlled electrically through wires 85 and is adapted to hold and fire a cartridge. The breech assembly and motor form a known type of cartridge actuated engine starting device and will not be described in detail herein. This mechanism operates when the circuit through wires 85 is energized to fire a cartridge in the breech assembly so that high pressure fluid charge of relative short duration will be supplied to the motor 78. In response to this charge the motor will move the clutch 79 into engagement with the clutch 81 and will then drive the clutch 81 and the reel assembly with an extremely high torque to accelerate it to the desired velocity in a very short interval of time. This construction is particularly advantageous since it is light in weight and occupies a small space and enables the reel to be accelerated rapidly without unwinding a large amount of cable therefrom.

The accelerating motor is controlled by connection of the cable to the load and for this purpose a hook as shown in Figure 4 may be employed. The hook is detachably connected to the rod 12 and is held assembled thereon by a spring urged keeper 86. When the keeper is in the position shown to hold the hook on the rod 12 it opens a switch 87 carried by the rod. When, however, the hook engages a loop 16 the keeper will be pressed down to disconnect the hook from the rod 12 and at the same time to release the switch 87 so that it may close. The switch 87 is connected in circuit with the wires 85 so that when it closes a cartridge in the breech assembly 82 will be fired. The hook as shown and described is more particularly described and claimed in the copending application to Rexford O. Anderson, Serial No. 481,711, filed April 3, 1943, now Patent No. 2,359,275, dated September 26, 1944.

In operation of this apparatus the breech mechanism 82 is loaded with a cartridge and the hook 13 is supported on the end of the rod 12 as shown in Figures 1 and 4. When the tow plane flies over a glider to be picked up the hook will engage the loop 16 moving the keeper 86 back against the spring and permitting the switch 87 to close. When this occurs the cartridge in the breech mechanism will be fired to actuate the motor 78 so that the reel and its associated parts will be driven at a speed to unwind the cable from the reel at substantially the same velocity as that of the tow plane. Thus when the cable engages the loop the cable will be paid out from the reel at substantially the same rate as the rate of travel of the plane so that no shock will occur at the time of initial engagement with the load.

As the cable is unwound from the reel due to operation of the driving motor and the pull of the load on the cable the diameter of the cable on the reel will decrease so that the follower roller 54 will turn the shaft 62 gradually to engage the brake drum 34. This will hold the gear carrier 32 against rotation so that as the reel turns it will turn the ring gear and through the idler pinions 31 will turn the sun gear 27 and shaft 26 in the reverse direction. This will turn the rotor member 25 in reverse direction and at the same time the casing 23 of the transmission will be turned forward by the reel so that the relative velocity between the two parts of the hydraulic transmission will be magnified. Thus the rotation of the reel is resisted through the hydraulic transmission so that a smooth and gradual braking force is applied to slow the rotation of the reel and to increase the speed of the glider.

As cable continues to be withdrawn the follower roller 63 will turn the shaft 53 to the point where the gear teeth 69 turn the segment 71 gradually to apply the brake 36. The braking force of this brake will be added to the hydraulic braking effect to slow the reel still further and finally to bring it to a full stop as the brake 36 becomes fully engaged. At this time, the glider is travelling at the same speed as the tow plane and may be towed at the end of the cable or, if desired, may be drawn closer to the tow plane by winding cable on the reel by motor 73 and gearing 74.

Figure 8 illustrates an alternative construction in which driving of the reel is effected in a different manner. In this construction, a frame 90 rotatably supports a reel 91 on which cable may be wound and which is formed with a brake drum 92. The reel is connected at one end to a clutch housing 93 carrying a clutch plate for engagement with clutch plates 94 keyed or splined to a center shaft 95. The shaft also carries a clutch collar 96 having clutch teeth on its end for engagement with complementary clutch teeth 97 formed on one hub of the reel. The two clutches are controlled by a sliding collar 98 which may be operated by a yoke 99 under the control of a solenoid 101. When the solenoid is energized the collar 98 will move to the right first to engage the clutch 94 and thereafter to bring the clutch teeth 96 into engagement with the teeth 97.

At the opposite end of the reel the shaft 95 is keyed or splined to a sleeve 102 on which a center gear 103 and a vaned hydraulic rotor 104 are mounted. The rotor 104 cooperates with vanes formed in a fluid transmission housing 105 and which is connected to a ring gear 106. The sun gear 103 and the ring gear 106 mesh with planet pinions 107 rotatably carried by a brake drum 108. At one end the shaft 95 is formed with driving means shown as a pulley 109 which may be driven through a belt from any desired type of motor.

In operation of this unit with the clutches 94 and 96 disengaged as shown, the shaft 95 may be driven through the pulley 109 to rotate the hydraulic transmission and the gearing as a unit. When the hook on the cable engages a load a circuit will be completed through the solenoid 101 to engage the clutch 94 thereby connecting the shaft 95 to the reel. The inertia of the several rotating parts will be transmitted to the reel to accelerate it rapidly to a velocity substantially equal to that of the tow plane but in opposite direction so that the load may be engaged without shock. Thereafter the brake drum 108 may be braked by mechanism similar to that shown in Figures 1 to 7 to cause relative rotation between the transmission parts 104 and 105 gradually and smoothly to resist rotation of the reel. Finally the brake 92 may be engaged to bring the reel to a complete stop as described above.

Figure 9 illustrates a somewhat simplified form of invention which is better adapted to the pick up of lighter loads. In this construction, a frame 111 rotatably supports a reel 112 formed at one end with a brake flange 113. The reel 112 is supported on and keyed to a shaft 114 terminating at one end in a clutch member 115 for connecting it to a driving device such as the expansion motor shown in Figure 2.

At the other end the shaft 114 is keyed to a vaned rotor member 116 enclosed in a vaned housing 117 to form a hydraulic transmission. The housing 117 carries a brake drum 118.

In the operation of this unit after the load has been engaged the brake 118 may be engaged to hold the casing 117 stationary. Rotation of the reel causes the rotor 116 to turn in the housing 117 to apply a braking force to rotation of the reel. As cable continues to be withdrawn from the reel, the brake 113 will be engaged to bring the reel to a full stop. Thus the operation of this construction is substantially the same as those described above except that a lesser degree of relative rotation is provided between the coupling parts.

While several embodiments of the invention have been shown and described in detail, it will be understood that they are illustrative only and are not intended as definition of the scope of the invention, reference being had for this purpose to the appended claims.

What is claimed is:

1. Apparatus for absorbing shock loads comprising a reel, a cable wound on the reel, means on the end of the cable for connecting it to a load, means to drive the reel in a direction to unwind cable therefrom, control means to initiate operation of the last named means when the cable is connected to the load, a brake connected to the reel, and control means for the brake to cause it to engage subsequent to the operation of the means for driving the reel.

2. Apparatus for absorbing shock loads comprising a reel, a cable wound on the reel, means on the end of the cable for connecting it to a load, a fluid transmission having one element connected to the reel, a brake connected to the other element of the fluid transmission, a brake connected to the reel, means to drive the reel in a direction to unwind cable therefrom, control means operable in response to connection of the cable to a load to initiate operation of the last named means, and control means for the brakes operable subsequent to the reel drive means to engage the first named brake and then to engage the last named brake.

3. Apparatus for absorbing shock loads comprising a reel, a cable wound on the reel, means on the end of the cable for connecting it to a load, a fluid coupling having one element connected to the reel, a brake connected to the other element of the fluid coupling, a brake connected to the reel, means to drive the reel in a direction to unwind cable therefrom, control means operable in response to connection of the cable to a load to initiate operation of the last named means, and control means for the brakes responsive to the diameter of the cable on the reel to engage the first named brake and thereafter to engage the last named brake.

4. Apparatus for absorbing shock loads comprising a reel, a cable on the reel, a hook on the end of the cable for connecting it to a load, power means for driving the reel in a direction to unwind cable therefrom, and means on the hook operated by engagement thereof with a load to initiate operation of the power means.

5. Apparatus for absorbing shock loads comprising a reel, a cable on the reel, means on the cable for connecting it to a load, an expansion motor, means connecting the expansion motor to the reel to drive the reel in a direction to unwind cable therefrom, a breech assembly adapted to contain and fire a cartridge connected to the expansion motor to deliver a high pressure charge of fluid of short duration to the motor, and control means operated by connection of the cable to a load to fire a cartridge in the breech assembly.

6. Apparatus for absorbing shock loads comprising a reel, a cable on the reel, means on the cable for connecting it to the load, an expansion motor, means connecting the expansion motor to the reel to drive the reel in a direction to unwind cable therefrom, a breech assembly adapted to contain and fire a cartridge connected to the expansion motor to deliver a high pressure charge of fluid of short duration to the motor, electrical means to fire a cartridge in the breech assembly, and a control switch for the electrical means operated by engagement of said means on the cable with a load.

7. Apparatus for absorbing shock loads comprising a reel, a cable on the reel, means on the cable to connect it to a load, a hydraulic transmission, means connecting one part of the transmission to the reel, differential gearing, means connecting two elements of the gearing to two parts of the transmission respectively, a brake to hold a third element of the gearing, an expansion motor having means for connecting it directly to the reel, a breech assembly adapted to hold and fire a cartridge connected to the motor to supply a high pressure charge of short duration thereto and means operable in response to connection of the cable to a load to fire a cartridge in the breech assembly.

8. Apparatus for absorbing shock loads comprising a reel, a cable on the reel, means on the cable to connect it to a load, a hydraulic transmission, means connecting one part of the transmission to the reel, differential gearing, means connecting two elements of the gearing to two parts of the transmission respectively, a brake to hold a third element of the gearing, a second brake connected directly to the reel, control means for the brakes responsive to the diameter of the cable on the reel initially to hold the brakes disengaged, power means for driving the reel in a direction to unwind cable therefrom, and control means for the power means to initiate its operation in response to connection of the cable to a load, the brake control means operating as the cable diameter on the reel decreases to engage the first named brake and thereafter to engage the second brake.

9. Apparatus for absorbing shock loads comprising a reel, a cable on the reel, means to connect the cable to a load, power means to drive the reel in a direction to unwind cable therefrom, brake means associated with the reel to resist rotation of the reel in response to a load on the cable, means operable in response to connection of the cable to a load to initiate operation of the power means, and means to engage the brake means subsequent to initiation of the operation of the power means.

10. Apparatus for absorbing shock loads comprising a reel, a cable on the reel, means to connect the cable to a load, power means to drive the reel in a direction to unwind cable therefrom, hydraulic means connected to the reel to resist rotation thereof in response to a load on the cable, means operable in response to connection of the cable to a load to initiate operation of the power means, and control means for the hydraulic means to make it effective after operation of the power means.

REXFORD O. ANDERSON.
MAX E. LANDRY.
WALLACE F. ARDUSSI.